US008885372B1

(12) United States Patent
Nanut

(10) Patent No.: US 8,885,372 B1
(45) Date of Patent: Nov. 11, 2014

(54) LOW HARMONIC CONTENT AC TO DC POWER CONVERSION

(71) Applicant: James Nanut, Toorak (AU)

(72) Inventor: James Nanut, Toorak (AU)

(73) Assignee: James Nanut, Toorak (AU)

( * ) Notice: Subject to any disclaimer, the term of this patent is extended or adjusted under 35 U.S.C. 154(b) by 59 days.

(21) Appl. No.: 13/797,514

(22) Filed: Mar. 12, 2013

Related U.S. Application Data

(63) Continuation-in-part of application No. 12/890,311, filed on Sep. 24, 2010, now Pat. No. 8,553,440.

(60) Provisional application No. 61/609,571, filed on Mar. 12, 2012, provisional application No. 61/609,573, filed on Mar. 12, 2012, provisional application No. 61/609,575, filed on Mar. 12, 2012.

(51) Int. Cl.
H02M 7/02 (2006.01)
H02M 1/12 (2006.01)
H02M 1/14 (2006.01)
H02M 7/145 (2006.01)

(52) U.S. Cl.
CPC . *H02M 1/12* (2013.01); *H02M 1/14* (2013.01)
USPC .............................. 363/69; 307/11

(58) Field of Classification Search
USPC .......... 363/65, 67, 68, 69, 70; 307/11, 13, 16, 307/31
See application file for complete search history.

(56) References Cited

U.S. PATENT DOCUMENTS

| 3,657,633 | A | | 4/1972 | Urish | |
|---|---|---|---|---|---|
| 3,838,330 | A | | 9/1974 | Rosa | |
| 4,255,784 | A | | 3/1981 | Rosa | |
| 4,276,589 | A | | 6/1981 | Okawa et al. | |
| 4,366,532 | A | | 12/1982 | Rosa et al. | |
| 4,460,950 | A | | 7/1984 | Finney | |
| 7,050,313 | B2 | | 5/2006 | Huang et al. | |
| 7,609,536 | B2 | * | 10/2009 | Brochu et al. | 363/69 |
| 8,081,492 | B2 | * | 12/2011 | Nakahori | 363/16 |
| 8,553,440 | B1 | * | 10/2013 | Nanut et al. | 363/129 |
| 8,723,385 | B2 | * | 5/2014 | Jia et al. | 310/168 |
| 2001/0022736 | A1 | * | 9/2001 | Suzuki | 363/69 |
| 2005/0135126 | A1 | * | 6/2005 | Gazel et al. | 363/67 |

FOREIGN PATENT DOCUMENTS

| GB | 1367571 | 9/1974 |
|---|---|---|
| GB | 2108784 A | 5/1983 |

OTHER PUBLICATIONS

International Search Report and Written Opinion mailed Feb. 27, 2012, for International Application No. PCT/IB2011/002171, 11 pages.

* cited by examiner

Primary Examiner — Gary L Laxton
(74) Attorney, Agent, or Firm — Blakely, Sokoloff, Taylor & Zafman LLP

(57) ABSTRACT

An AC power conversion system includes a first AC/DC converter to be coupled to a multi-phase AC power supply, a second AC/DC converter coupled in parallel with the first AC/DC converter to the multi-phase AC power supply, a first DC load in series with a first inductor coupled to a first positive DC terminal of the first AC/DC converter and a second negative DC terminal of the second AC/DC converter, and a second DC load in series with a second inductor coupled to a first negative DC terminal of the first AC/DC converter and a second positive DC terminal of the second AC/DC converter.

20 Claims, 14 Drawing Sheets

LOW HARMONIC CONTENT AC TO DC POWER CONVERSION

RELATED APPLICATIONS

This application is a continuation-in-part (CIP) of U.S. patent application Ser. No. 12/890,311, filed Sep. 24, 2010. This application also claims the priority of U.S. Provisional Patent Application No. 61/609,571, filed Mar. 12, 2012, U.S. Provisional Patent Application No. 61/609,573, filed Mar. 12, 2012, and U.S. Provisional Patent Application No. 61/609,575, filed Mar. 12, 2012. The disclosure of the above applications is incorporated by reference herein in its entirety.

FIELD OF THE INVENTION

The present invention relates generally to power conversion technologies. More particularly, this invention relates to power conversion circuits with low harmonic content.

BACKGROUND

In a conventional line commutated three phase six-pulse controlled alternating current to direct current (AC/DC) converter (or Graetz bridge), each thyristor is triggered at a non-zero delay angle, denoted alpha, from the zero crossover of the anode-to-cathode voltage of the thyristor yielding an AC current that lags the AC voltage by an angle approximately equal to the angle alpha. The AC current contains a real and reactive component. The DC voltage and current contains a predominantly DC component with a superimposed AC component, sometimes referred to as ripple.

The load on the DC side of a six-pulse controlled converter may be resistive, inductive, or a DC source (e.g. battery) or a combination of all three components, depending on the application. The delay angle, alpha, of the converter can theoretically be between 0 and 180 degrees, depending on the application. A delay angle between 0 and 90 degrees implies real power flows from AC to DC, this is known as rectification. A delay angle between 90 and 180 implies real power flows from DC to AC, this is known as inversion. A delay angle of 90 degrees implies the converter draws purely reactive power (theoretically zero real power). This type of conversion can be referred to as reactive compensation. The AC current in a conventional six pulse converter is polluted with a high amount of harmonics (around 30% or greater) as the waveform is trapezoidal, with a conduction period of 120 degrees in each thyristor.

FIG. 1 is a schematic diagram illustrating a typical power converter. Referring to FIG. 1, system 100 includes an anti-parallel DC connection of two six-pulse line commutated three phase thyristor controlled converters 101 and 102, the DC terminals of which are connected in anti-parallel via DC loads 103-104, which may include a reactor L, load R and DC source, Edc. An average alpha delay angle (between 0 and 180 degrees) is chosen for the system and each six-pulse converter is triggered continuously at a displacement angle $\Delta\alpha$ in advance or in delay to the nominal alpha, $\alpha$.

Each thyristor of converter 101 is triggered at a displacement angle of 15 degrees advanced of the average delay angle, and each thyristor of converter 102 is triggered at a displacement angle of 15 degrees delayed of the average delay angle. By triggering in this fashion the DC voltage measured over one period can be calculated in proportion to the average alpha. The AC current in each of the bridges 101-102 will be displaced on either side by an angle $\Delta\alpha$ from the nominal alpha, $\alpha$. The total fundamental AC current drawn by each converter will therefore be out of phase by 30 degrees compared to the other ($2*\Delta\alpha$). This is shown in waveforms 151 and 152. By adding vectoraly a harmonic vector from each bridge, taking into account the 30 degree difference in phase shift between fundamental current harmonic components, the magnitude of the vectoral sum will be less than twice the magnitude of the harmonic order of the individual AC bridge currents (see waveform 153). This is true for each harmonic order contained in the AC current. As a result, there is a significant reduction of harmonic content in the total AC current.

Using this method of controlling the bridges means the AC ripple voltage "sawtooth" (waveform 154) that is superimposed on the DC load 103 and 104 becomes larger than in the conventional 6 pulse circuit, and contains harmonics that are of a lower harmonic order. Since the current ripple is determined by the voltage ripple divided by the DC impedance at low frequencies a larger DC reactance is required in order to maintain a low current ripple and continuous DC current. As can be seen for the parameters used in the example of FIG. 1, waveform 155, the DC current ripple is large and only barely maintains continuity. For this application, multiple reactors of different sizing or a single a reactor with a "stepped" gap can be used in order to maintain DC current continuity at low currents however the complexity and size of the DC elements, when taking into account the impact on the control system, can make this option impractical.

Finally, depending on the displacement angle chosen the combined a larger ripple current on the DC side can mean that the AC current remains rich in some harmonic orders and the level of harmonic attenuation for each order is lower than would be theoretically expected. FIG. 2 shows waveforms of different components in FIG. 1. Referring to FIG. 2, waveform 150 is a reference of firing for the thyristors, waveform 151 shows a current through one phase of inductors 107; waveform 152 shows a current through one phase of inductors 106; waveform 153 shows a current through one phase of inductors 105; waveform 154 shows a voltage across a DC load 103; and waveform 155 shows a current through DC load 103.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention offer methods to greatly reduce the harmonics of the AC current waveform and reduce the necessary sizing of the DC inductance and complexity of design. It also reduces or eliminates completely the need for separately wound commutating reactance that are a necessary feature on the AC side of all thyristor line commutated converters. This can be especially advantageous in high power equipment and at nominal control angle (alpha) close to 90 degrees where the switching voltage of the thyristor is highest and the commutating inductance sizing is the largest and least efficient.

Figure 1:
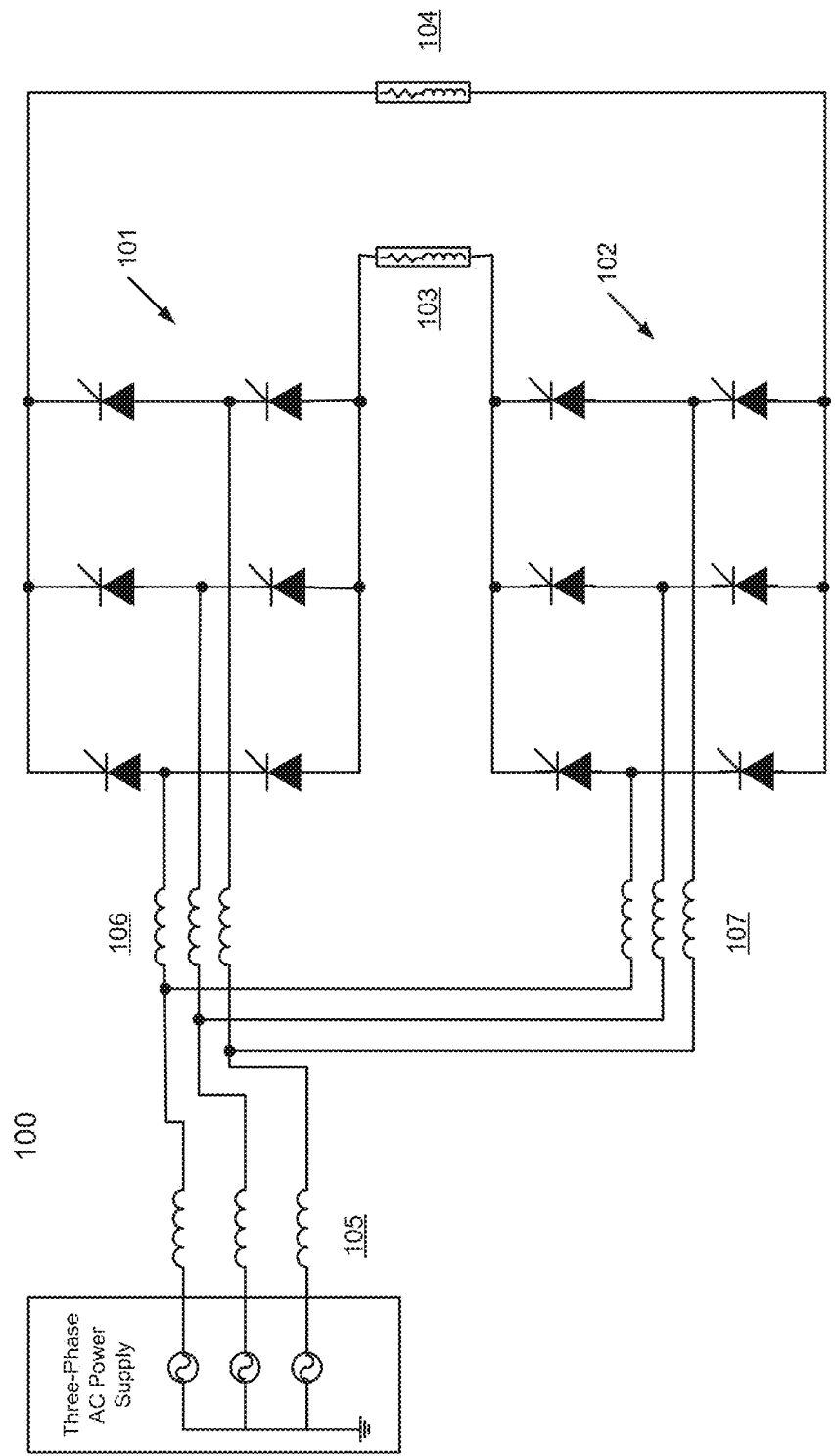
FIG. 1 is a schematic diagram illustrating a conventional power converter of 12 pulses.
Figure 2:
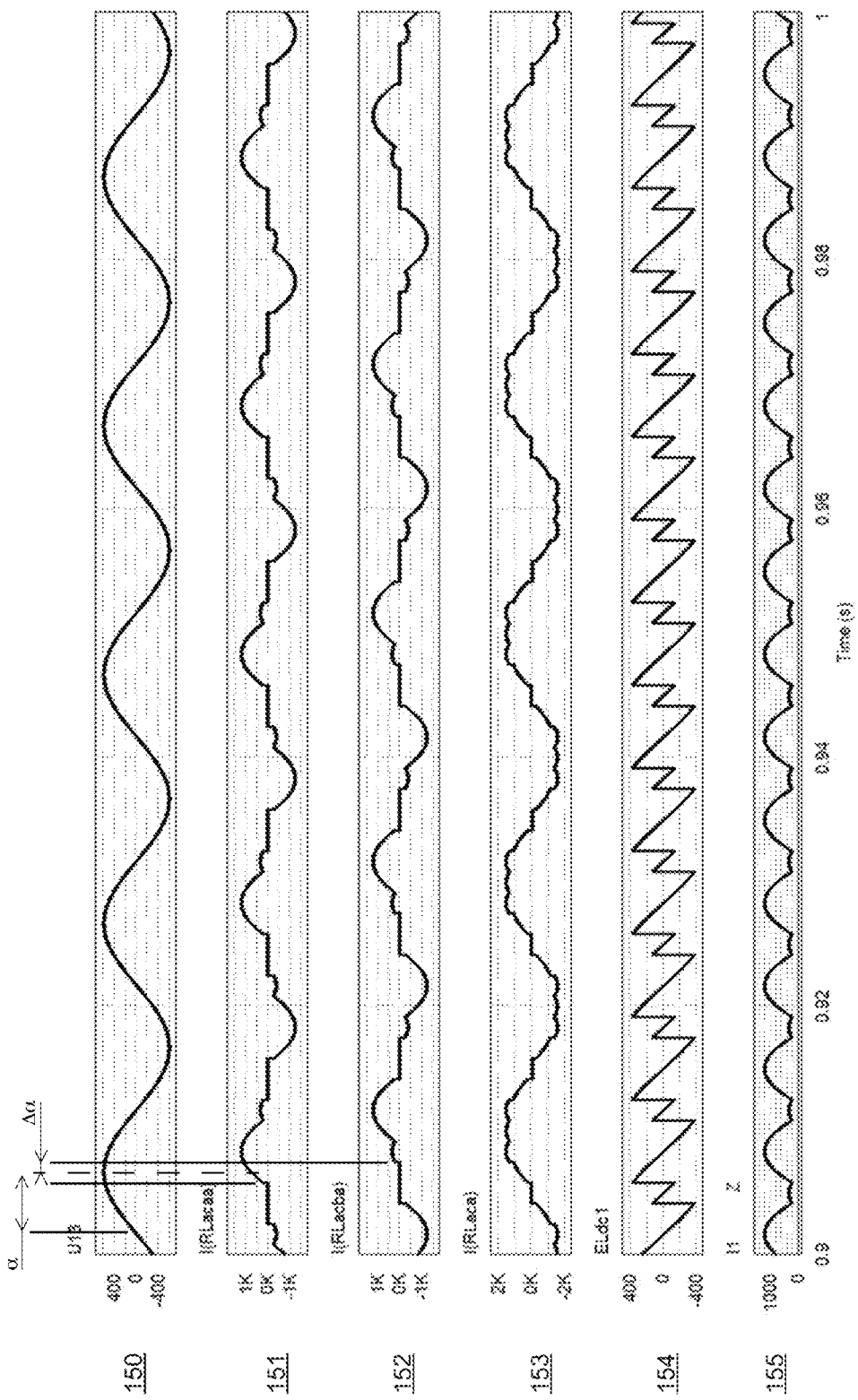
FIG. 2 is a diagram illustrating certain waveforms of certain components of a power converter as shown in FIG. 1.
Figure 3A:
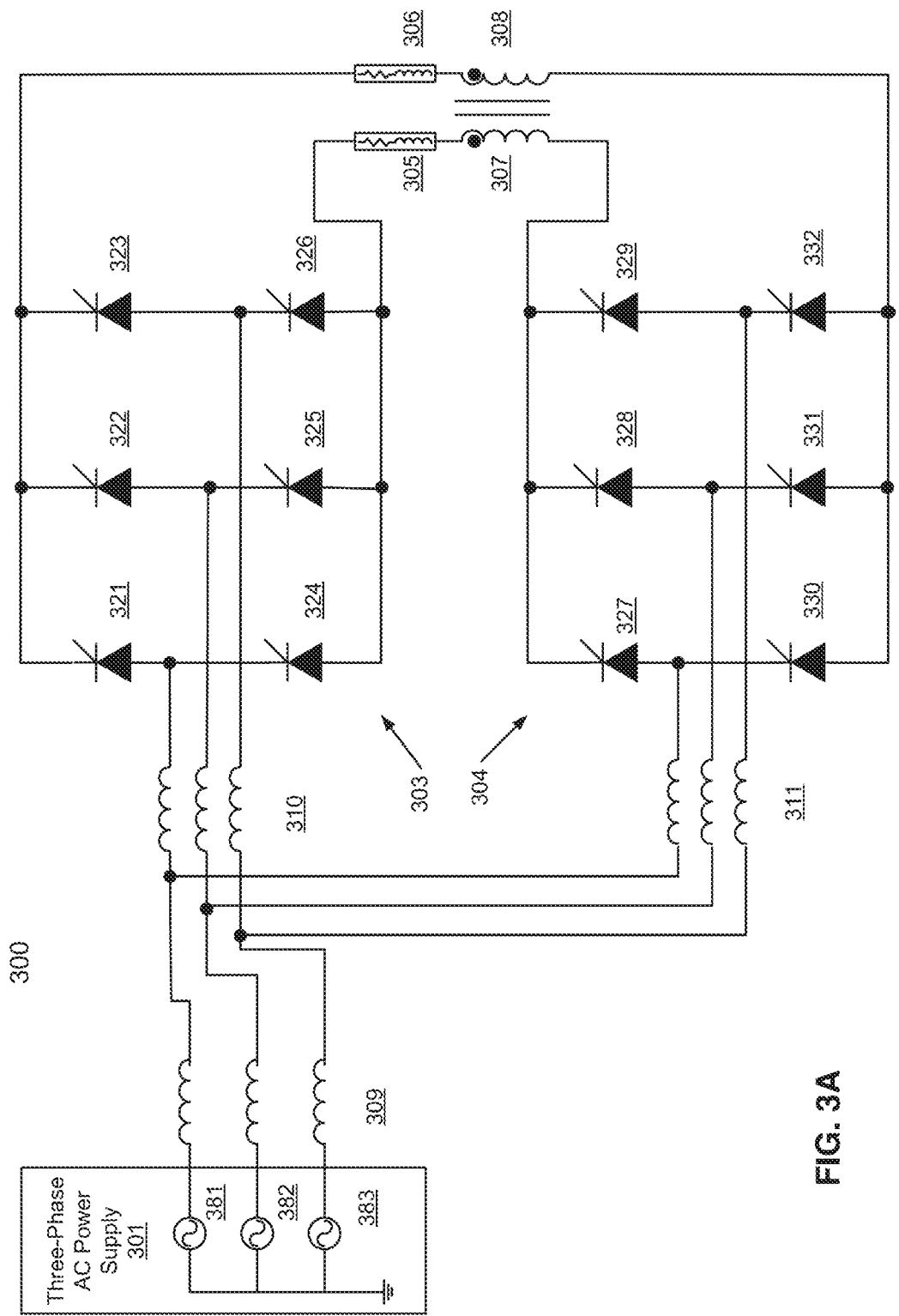
FIG. 3A is a schematic diagram illustrating a power converter according to one embodiment of the invention.

FIG. 3A is a schematic diagram illustrating an example of a power converter according to one embodiment of the invention. Referring to FIG. 3A, according to one embodiment, a transformer, or coupled inductance (e.g. inductors 307-308), with two coils is inserted in series with the DC side of bridges 303-304. The coupled inductance has two separate windings coupled (or wound) onto a common core. The purpose of the coupled inductor is to greatly reduce the AC voltage ripple superimposed on the DC voltage across DC loads 305-306, therefore reducing the necessary required sizing of the DC reactors 305-306 and alleviating other disadvantages described above with respect to the circuit of FIG. 1.

System 300 includes an antiparallel connection of two six-pulse, three-phase thyristor converters 303 and 304. The AC terminals of each converter are connected in parallel to the three phase line power supply 301, the DC terminals of each converter are connected in anti-parallel via a reactor (e.g., DC loads 305-306) and coupled inductor (307-308). It is possible to insert a DC source in series with DC loads 305 and 306, though this is not shown. Each thyristor of converter 303 is triggered at a displacement angle $\Delta\alpha$ of 15 degrees delayed of the average delay angle of the system, and each thyristor of converter 304 is triggered at a displacement angle of 15 degrees advanced of the average delay angle of the system. The combined effect of a difference in alpha delay angle and the antiparallel connection of the DC poles of the bridges 303-304 creates an AC voltage (known as the ripple voltage) superimposed onto the DC voltage appearing across load components 305, 306, 307 and 308.

Referring to FIG. 3A, in one embodiment, each of converters 303-304 includes six controllable rectifiers 321-326 and rectifiers 327-332, respectively, for passing respective phases of the AC power supply in turn at a respective firing angle for each circuit. A controller (not shown) is configured to provide control signals for symmetrically controlling the respective rectifiers of converters 303 and 304, such that during any power cycle the firing angles for the respective (or corresponding) rectifiers inside converters 303-304 are substantially equally but oppositely offset from a base angle.

In one embodiment, converters 303-304 may be substantially equal, and the respective loads and their DC currents are substantially equal. The firing angles for the corresponding rectifiers in each converter may be substantially equal but oppositely offset from a nominal delay angle $\alpha$ by, for example, 15° (e.g., $\Delta\alpha=\pm15°$). For example, given a rectifier of converter 303, all thyristors in 303 are fired continuously through each power cycle (or period) at $(\alpha+\Delta\alpha)$. For the corresponding rectifier 304, all thyristors are fired continuously at an equal displacement angle but with opposite polarity $(\alpha-\Delta\alpha)$ continuously through each power cycle. The magnitude of the offset value (e.g., $\Delta\alpha$) can be varied to adjust the cancellation of harmonic current components. Note that although two AC/DC converters are described with respect to FIG. 3A, three or more converters may also be utilized in parallel for the objective of increasing the number of pulses per power cycle.

In one embodiment, converters 303-304 may be substantially equal, and the respective loads and their DC currents are substantially equal. The firing angles for the corresponding rectifiers in each converter may be substantially equal but oppositely offset from a nominal delay angle ($\alpha$) by, for example, 15° (e.g., $\Delta\alpha=\pm15°$) in an alternated manner. For example, given a rectifier of a first AC/DC converter (e.g., converter 303), a first firing angle of the rectifier may be $(\alpha+\Delta\alpha)$ during a first power cycle (or period) and a second firing angle may be $(\alpha-\Delta\alpha)$ during a second power cycle. The next firing angle is configured back to $(\alpha+\Delta\alpha)$ in the third power cycle, etc. For the corresponding rectifier of a second or complementary AC/DC converter (e.g., converter 304), the corresponding firing angle is $(\alpha-\Delta\alpha)$ for the first power cycle and $(\alpha+\Delta\alpha)$ for the second power cycle, and $(\alpha-\Delta\alpha)$ for the third power cycle etc. The magnitude of the offset value (e.g., $\Delta\alpha$) can be varied to adjust the cancellation of harmonic current components. Note that although two AC/DC converters are described with respect to FIG. 3A, three or more converters may also be utilized in parallel for the objective of increasing the number of pulses per power cycle.

In one embodiment, system 300 includes, but not limited to, AC power supply 301 having respective phase to neutral voltages 381-383, AC/DC converters 303-304, DC loads 305-306, and mutually coupled inductors 307-308 coupled to DC loads 305-306 in series. Supply voltages 381-383 are connected between phase and neutral (or ground) and are phase displaced from one another. Given 381 is a reference, 382 lags 381 by 120 degrees and 383 lags 381 by 240 degrees. For the purpose of illustration, line to line voltages are defined as V1, V2, and V3. V1 is defined as the difference in potential between AC node voltage 381 and 383; V2 is defined as the difference in potential between AC node voltage 382 and 381;

V3 is defined as the difference in potential between AC node voltage 383 and 382. Converter 303 includes rectifiers 321-326 and converter 304 includes rectifiers 327-332, respectively. In one embodiment, a thyristor can be used as an example of any of rectifiers 321-332. A controller (not shown) is configured to provide gate control signals to rectifiers 321-332 of AC/DC converters 303-304. Coupled inductor 307 and DC load 305 are connected in series across a negative terminal of converter 303 and a positive terminal of converter 304. Coupled inductor 308 and DC load 306 are connected in series across a negative terminal of converter 304 and a positive terminal of converter 303. Coupled inductors 307 and 308 are wound onto the same inductor core. There is theoretically no gap in the iron core of coupled inductor 307 and 308, hence it can also be referred to as a transformer with two windings.

Voltages 381-383 represent respective phases of a three-phase AC power supply 301, for example, as supplied by an electrical power utility. In this example, converters 303-304 are connected in parallel to three-phase AC power supply 301. The loads 305-306 can also include a DC source (battery) or an Inverter. Reactors 309-311 represent transformer, cabling and connection impedances and are considered to be of sizing typical to a three-phase AC transmission network. For example, the total series reactance is typically approximately (or less than) 5% of the voltage drop at full current rating of the supply.

Three-phase electric power is a common method of AC electric power transmission. It is a type of polyphase systems, and is the most common method used by electric power distribution grids worldwide to distribute power. It is also used to power large motors and other large loads. A three-phase system is generally more economical than others because it uses less conductor material to transmit electric power than equivalent single-phase or two-phase systems at the same voltage. In a three-phase system, three circuit conductors carry three alternating currents (of the same frequency) which reach their instantaneous peak values at different times. Taking one conductor as the reference, the other two currents are delayed in time by one-third and two-thirds of one cycle of the electrical current. This delay between phases has the effect of giving constant power transfer over each cycle of the current, and also makes it possible to produce a rotating magnetic field in an electric motor.

A rectifier is an electrical device that converts AC to DC, a process known as rectification. Rectifiers have many uses including as components of power supplies and as detectors of radio signals. Rectifiers may be made of solid state diodes, vacuum tube diodes, mercury arc valves, and other components. In one embodiment, a thyristor is used as an example of a rectifier. Turn on of the thyristor may be accomplished by a "positive current" pulse between the gate and cathode terminals. Turn off of a thyristor, in a line commutated three-phase AC/DC converter, is achieved by reversing the current in the thyristor. This can be achieved by firing the next thyristor that shares a common cathode (or anode) in sequence, setting up a circulating current between phases that reverses the current direction and turns off the device. Although a thyristor is used as an example of a rectifier through this application, it will be appreciated that other types of controlled switches can also be utilized.

A controller (not shown, also referred to as a gate trigger unit) may be implemented using analog circuitry or, more preferably, by using a microprocessor or microcontroller (e.g., field programmable gate arrays or FPGAs) which can be more readily programmed or adjusted as required to control the firing of converters 303-304. For example, a controller may include a machine-readable storage medium (e.g., memory) to store machine executable instructions that have been programmed according to one or more predetermined algorithms and a processor or processing logic or signal generator to generate proper gate trigger signals having proper firing angles for each of rectifiers 321-332 based on the programmed algorithms.

In this example, the controller may produce 12 gate trigger signals, one for each of rectifiers 321-332. In this example, converter 303 includes six rectifiers 321-326 and requires six triggering pulses to drive rectifiers 321-326 and converter 304 includes six rectifiers 327-332 and requires another six gate triggering pulses to drive rectifiers 327-332. Converters 303-304 are also referred to as three-phase bridges. Rectifiers 321-323 are referred to as the positive group of rectifiers of converter 303. Rectifiers 327-329 are referred to as the positive group of rectifiers of converter 304. Rectifiers 327-329 are considered corresponding rectifiers to 321-323, respectively. Rectifiers 324-326 are referred to as the negative group of rectifiers of bridge 303. Rectifiers 330-332 are referred to as the negative group of rectifiers of bridge 304. Rectifiers 330-332 are considered corresponding rectifiers to 324-326, respectively.

Reference to "corresponding rectifier" throughout this application is taken to mean, in the case that multiple bridges that are substantially similar or identical in an embodiment, the rectifier in an alternate bridge that is connected in the same position as the original bridge. Referring to FIG. 3A, for example, rectifier 327 is the corresponding rectifier of rectifier 321. Similarly, rectifier 321 can be referred to as the corresponding rectifier of rectifier 327. Similarly, Rectifier 330 is the corresponding rectifier of rectifier 324. Similarly, rectifier 324 can also be referred to as the corresponding rectifier of rectifier 330, and so on.

According to one embodiment, system 300 is controlled at a nominal control angle α (e.g. approximately 90 degrees), therefore drawing substantially only reactive power from the AC supply 301 in this example. Rectifiers inside converter circuits 303-304 are switched in a complementary fashion, at firing angles which are substantially equally offset (offset, meaning advanced or delayed, or added/subtracted) from the nominal control angle by an offset angle Δα.

Figure 3B:
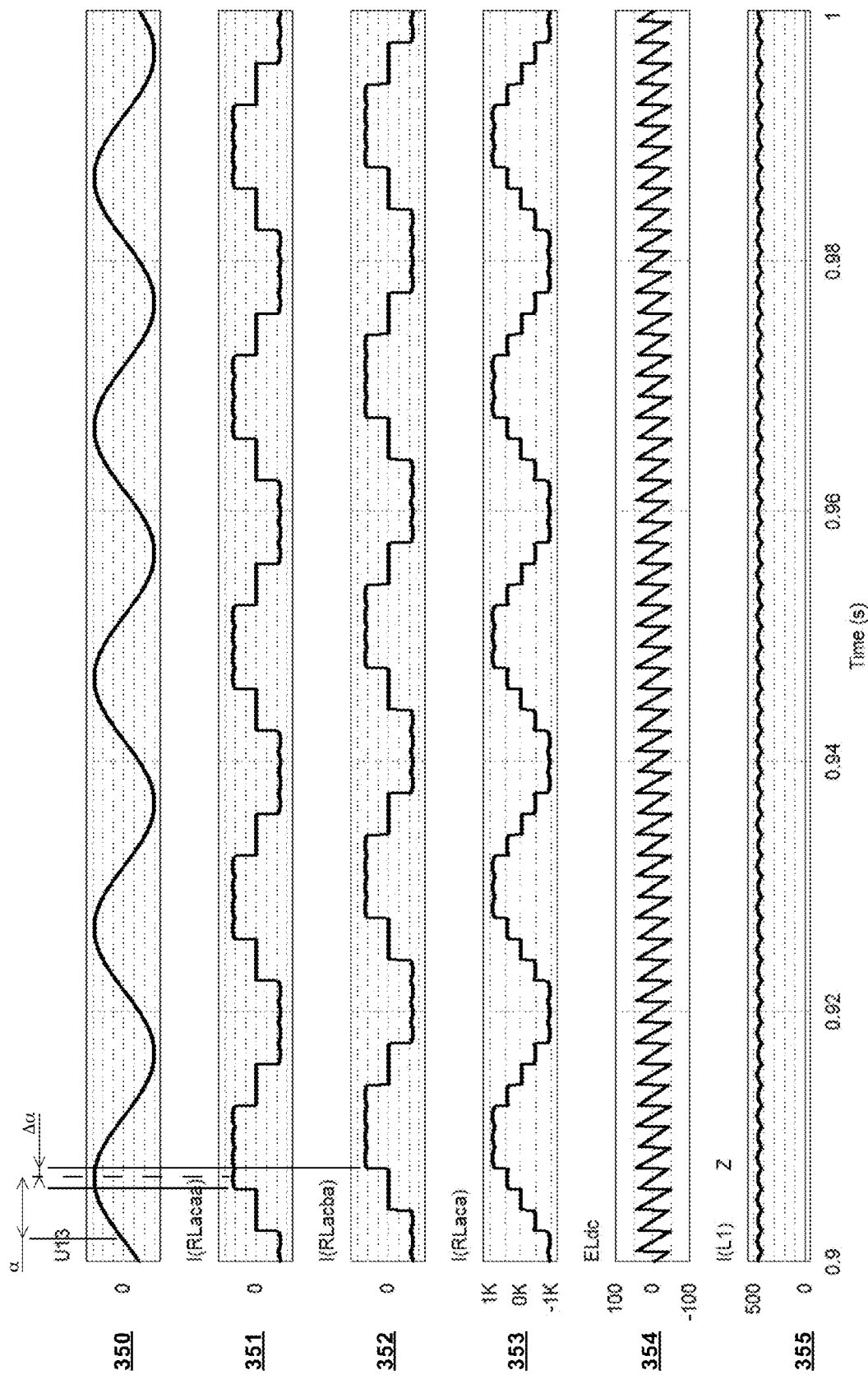
FIG. 3B is a diagram illustrating certain waveforms of certain components of a power converter as shown in FIG. 3A.

FIG. 3B is a diagram illustrating certain waveforms of certain components of FIG. 3A. Referring to FIG. 3B, waveform 351 shows the current of one phase of inductors 311; waveform 352 shows the current of one phase of inductor 310; waveform 353 shows the current through one phase of inductor 309; waveform 354 shows the voltage across the load 305; and waveform 355 shows a current through DC loads 305 and 306.

As can be seen in FIG. 3B waveform 354, the presence of the coupled inductor 307-308 in series with the DC load 305-306 means the ripple voltage across the DC load 305 is lower in magnitude and the fundamental frequency is of a higher order when compared to waveform 154. This means the DC smoothing reactance in load 305 and 306 can be smaller in inductance and physical size while achieving the same magnitude of DC current ripple as for converter 100. In this example DC reactances 305 and 103 are identical in size but comparison of DC current waveforms 355 and 155 show that the current ripple in system 300 is smaller due to the presence of mutual inductance 307-308 (compare waveforms 155 and 355). The AC current in each 6 pulse bridge is closer to quasi-square in shape due to the lower DC ripple current (compare waveforms 353 and 153). For the displacement angle chosen (15 degrees) the fifth harmonic (250 Hz) is less in magnitude for system 300 compared to system 100.

Figure 4A:
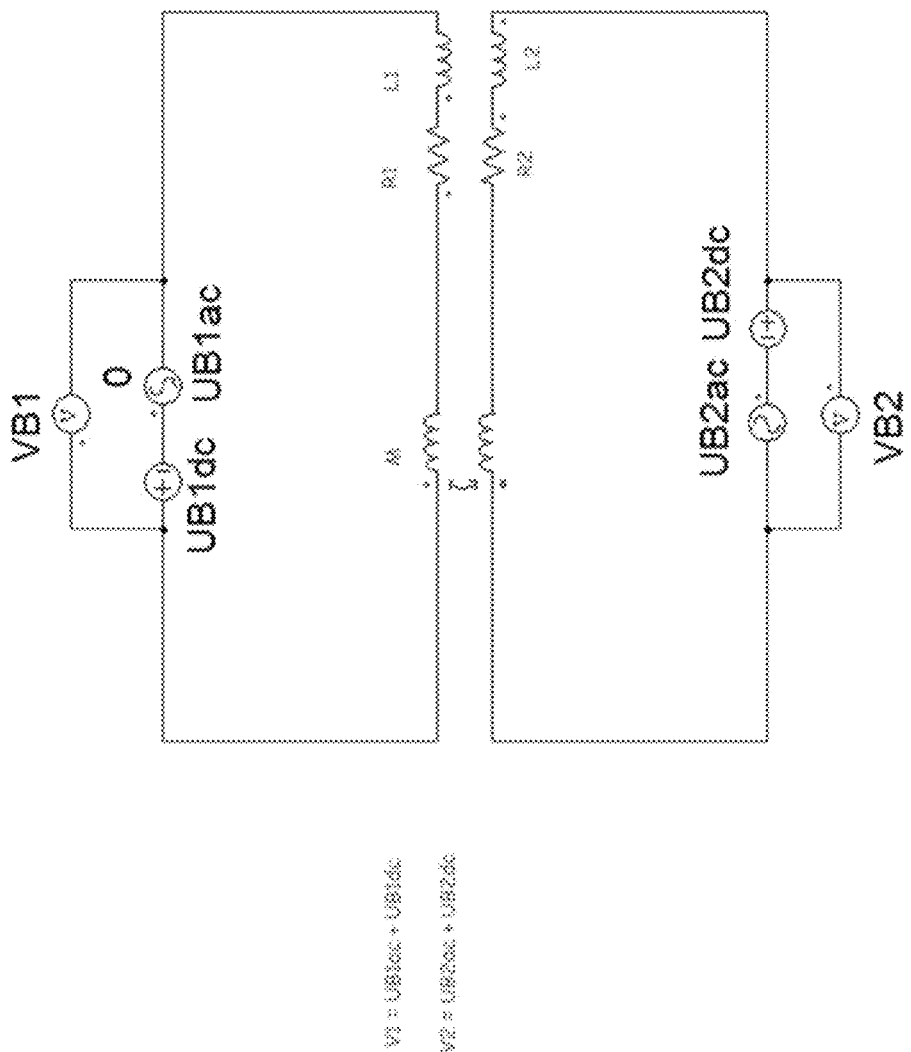
FIG. 4A is a schematic diagram illustrating a simplified version of a power converter of FIG. 3A.
Figure 4B:
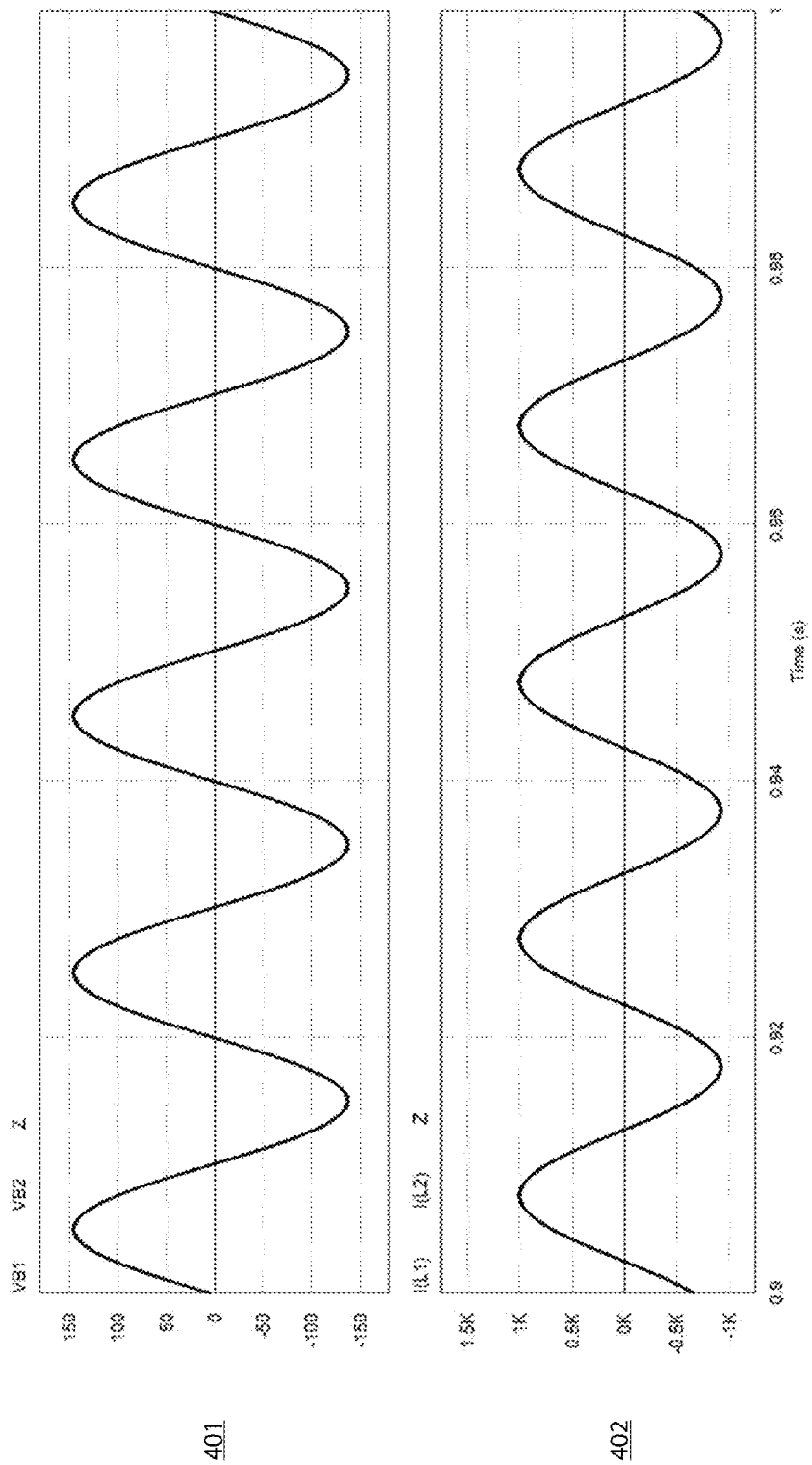
FIG. 4B is a diagram illustrating certain waveforms of certain components of a power converter as shown in FIG. 4A.
Figure 5A:
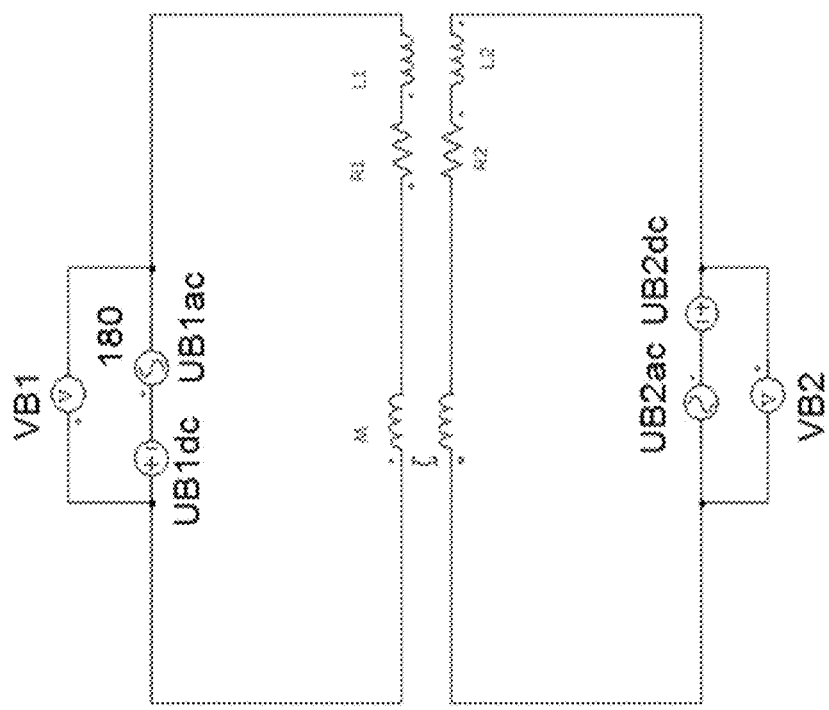
FIG. 5A is a schematic diagram illustrating another simplified version of a power converter of FIG. 3A.
Figure 5B:
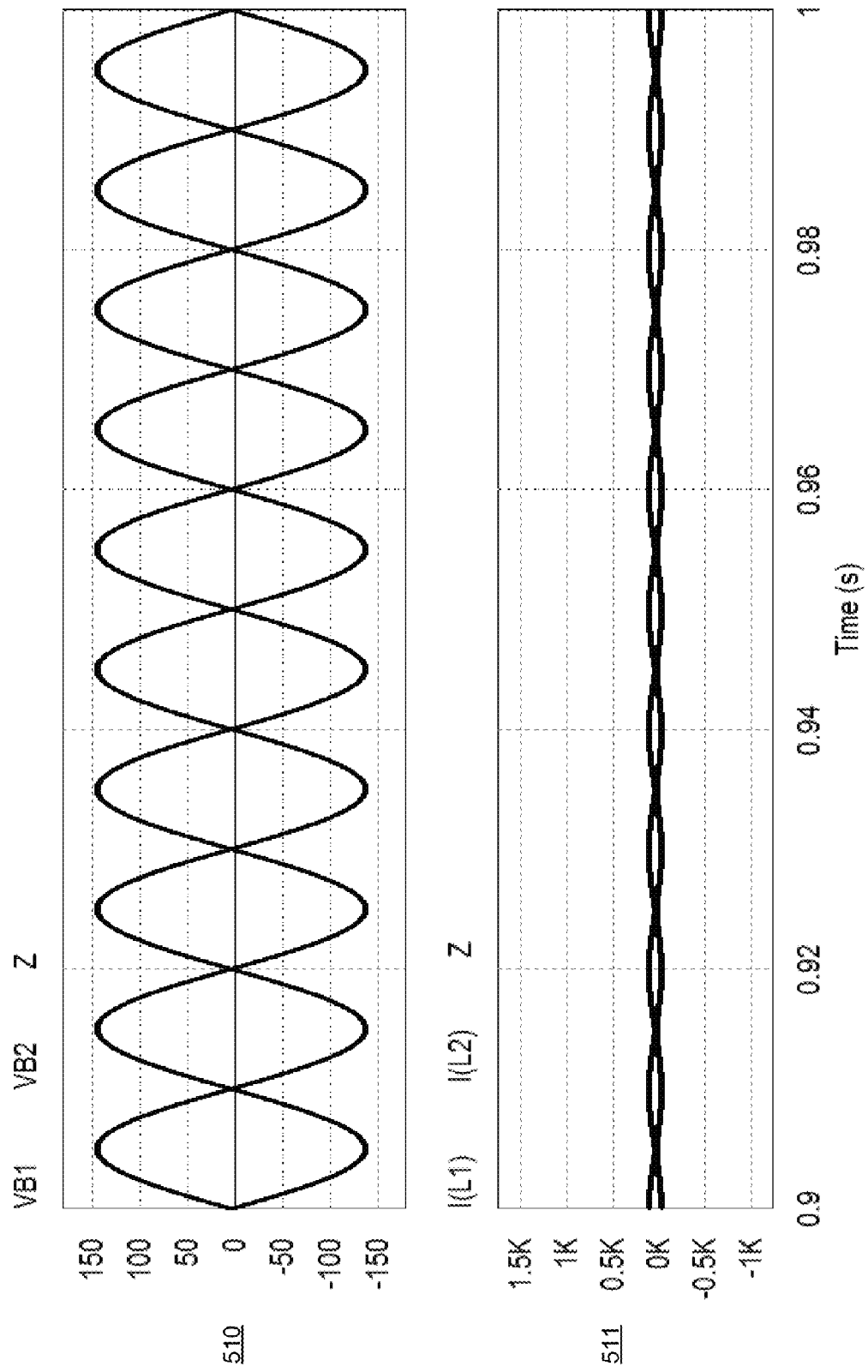
FIG. 5B is a diagram illustrating certain waveforms of certain components of a power converter as shown in FIG. 5A.

FIGS. 4 and 5 illustrate how the coupled inductance helps to reduce harmonics. FIG. 4A illustrates a simplified equivalent circuit of FIG. 3A. The coils of the coupled inductor are connected in series with each DC link. The coils are coupled by the same core, so the coupling coefficient that determines the mutual inductance is assumed to be close to unity. Voltage source VB1 represents the voltage ripple existing between the positive pole of bridge 303 and the negative pole of Bridge 304. The load is resistance and inductance R1 and L1 respectively, and the first coil of the coupled inductance M. Voltage source VB2 represents the voltage ripple existing between the positive pole of Bridge 304 and the negative pole of Bridge 303. The load is resistance R2 and L2 respectively and the second coil of the coupled inductance M. To simplify this explanation the voltage sources V1 and V2 are considered pure sinusoidal wave of frequency 50 Hz with equal magnitude of AC and DC components. Sources VB1 and VB2 are in phase. FIG. 4B shows the waveforms for FIG. 4A. Waveform 401 shows voltages VB1 and VB2, waveform 402 shows the resultant current flowing through L1 and L2. As can be seen 402 has a very large AC component superimposed onto a small DC component.

Figure 5C:
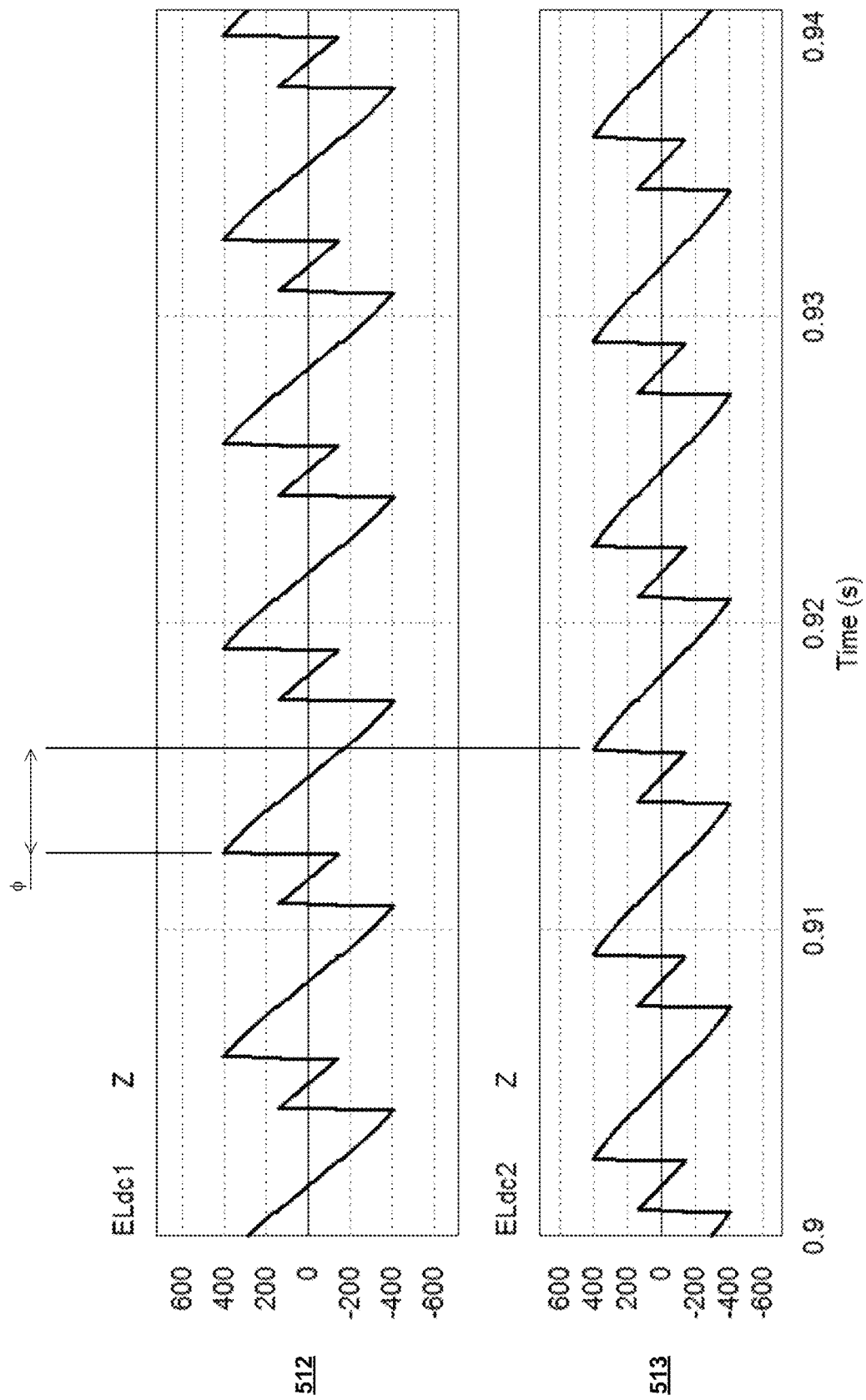
FIG. 5C is a diagram illustrating certain waveforms of certain components of a power converter as shown in FIG. 3A.

FIG. 5A shows an identical circuit to FIG. 4A except that there is a phase shift of 180 degrees imposed between source voltages VB1 and VB2. FIG. 510 shows source voltages VB1 and VB2, and FIG. 511 shows the resultant current flowing through L1 and L2. By comparing waveforms 511 and 402 it can be seen the AC current through L1 and L2 is greatly diminished when a phase shift is present between VB1 and VB2. This means that current harmonics that are in opposite phase are considerably reduced when a mutual inductance is inserted into the DC path. This is due to the impedance of the self inductance of a mutual coil plus the mutual inductance being inserted in series with the DC reactor L. Given the coupling coefficient between coils of the mutual being ~1 this means almost twice the self inductance of the mutual is inserted in series with L1 and L2 in each DC path. For the application of system 300 (FIG. 3A) the same reasoning can be applied to explain the function of the coupled inductance in reducing the current ripple on the DC side of the converters. The voltage waveform across each DC load is illustrated in FIG. 5C. Waveform 512 shows the voltage across load components 305 and 307, and waveform 513 shows the voltage across load components 306 and 308. The waveforms are displayed over a time period of two power cycles. As can be observed waveforms 512 and 513 are identical except for a phase shift, $\phi$, between one another. The current harmonics generated due to the phase shift between 512 and 513 are attenuated due to the presence of the coupled inductance.

The value of each current harmonic can be calculated by dividing the voltage harmonic by the addition of the self, mutual and load inductance, L. In practice the self inductance of each coil of M is can be designed to be very large in a small volume because there is no DC component of flux to consider due to the coupling between the two DC paths. The coupling coefficient can be designed to be close to unity by ensuring close proximity of the two windings of the coupled inductor.

In principle it has been shown that the coupled inductance will attenuate current harmonics on the DC side of the converters when there is a phase difference present in source voltages. In the circuit of FIG. 3A the difference in alpha between the two bridges caused by the introduction of the delay angle $\Delta\alpha$ in each bridge means that there is a phase shift in DC voltage waveforms across each DC link. The harmonic order magnitudes and phase of each sawtooth shaped source voltage can be found by means of Fourier analysis.

Figure 6A:
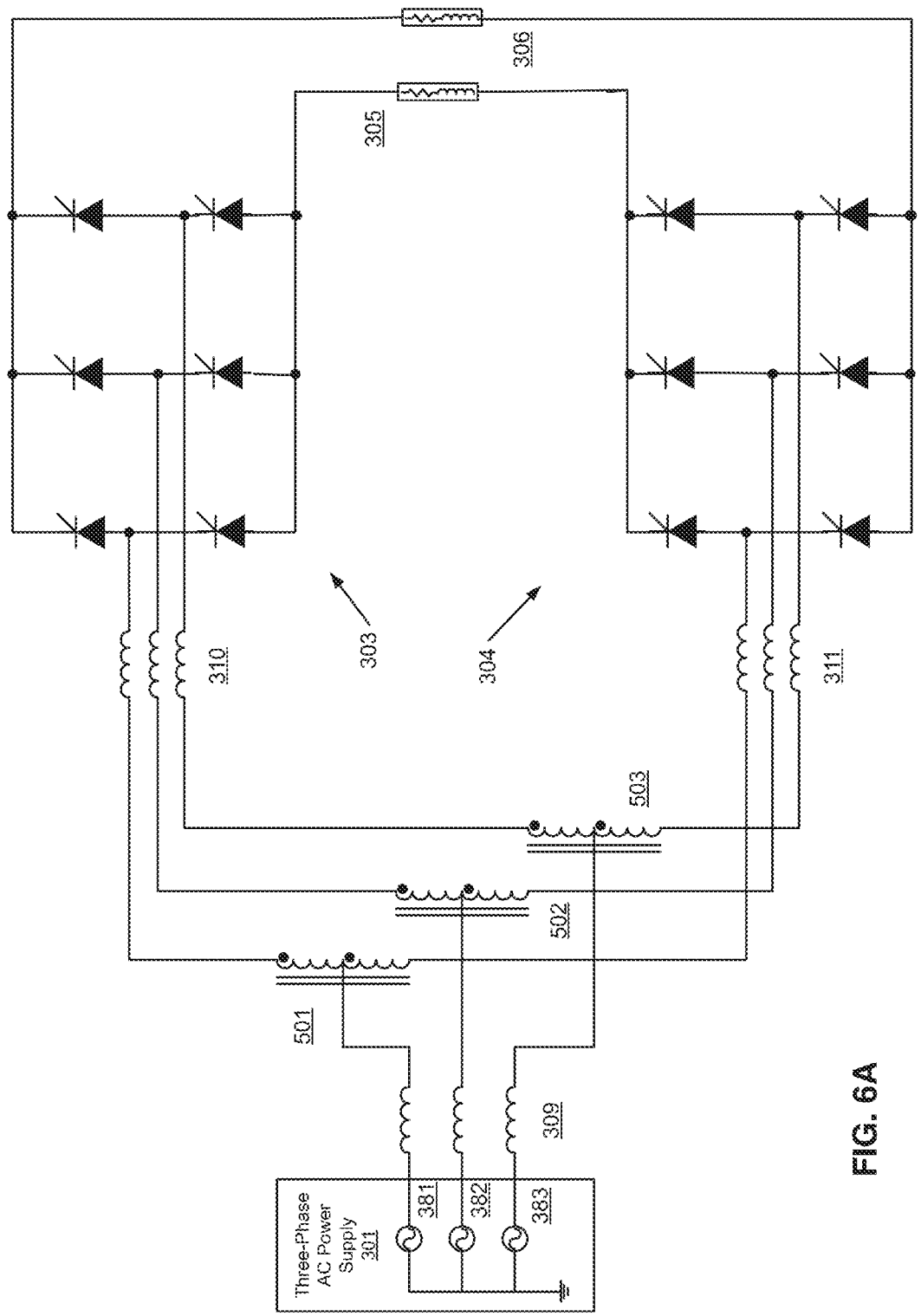
FIG. 6A is a schematic diagram illustrating a power converter according to another embodiment of the invention.

In some applications it may be advantageous to connect the coupled inductor to the AC side of the three phase bridges instead of in series with the DC side of the three phase bridges or the load. FIG. 6A shows an embodiment of the invention connected to the AC side. Each line of the AC supply voltage source is connected to a center tap of a three winding, single core leg coupled inductance. Each start of each winding is connected to the three phase input of converter 303. The finish of each winding is connected to the three phase input of converter 304. In this example, line 381 of power supply 301 is coupled to a center tap of mutually wound three-terminal inductor 501. A first winding terminal of inductor 501 is coupled to a first phase input of converter 303 and a second winding terminal of inductor 501 is coupled to a first phase input of converter 304. Line 382 of power supply 301 is coupled to a center tap of mutually wound three-terminal inductor 502. A first winding terminal of inductor 502 is coupled to a second phase input of converter 303 and a second winding terminal of inductor 502 is coupled to a second phase input of converter 304. Line 383 of power supply 301 is coupled to a center tap of mutually wound three-terminal inductor 503. A first winding terminal of inductor 503 is coupled to a third phase input of converter 303 and a second winding terminal of inductor 503 is coupled to a third phase input of converter 304. Note that two additional mutually coupled inductors (e.g., similar to inductors 307-308) may also be coupled in series to the DC loads 305-306 to reduce AC ripple effects on the DC loads 305-306, similar to the configuration as shown in FIG. 3A.

Figure 6B:
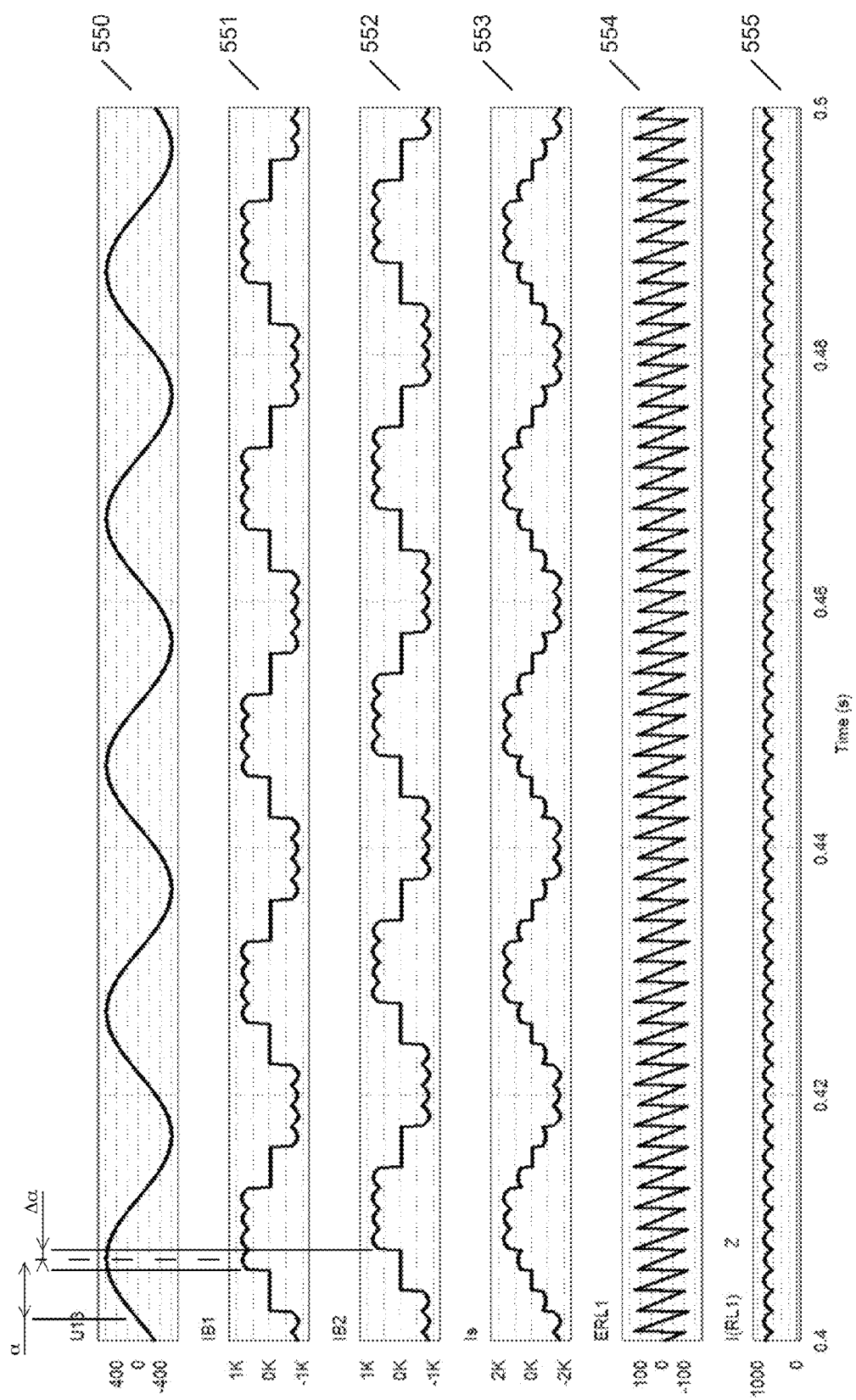
FIG. 6B is a diagram illustrating certain waveforms of certain components of a power converter as shown in FIG. 6A.

FIG. 6B shows waveforms belonging to the circuit of FIG. 6A, with the displacement angle $\Delta\alpha$ equal to 15 degrees. Waveform 550 is a reference for nominal $\alpha$. Waveforms 551-552 show AC currents flowing in each converter through one phase of inductors 310-311. Waveform 553 shows the total AC current of one phase of inductor 309. Waveform 554 shows the voltage across DC load 305 and 306. Waveform 555 shows a current flowing through the DC load 305 and 306. As can be seen waveforms 553, 554 and 555 are substantially of a 12 pulse nature, with 12 peaks per power cycle (20 ms).

In this configuration the coupled inductors can, in theory, provide series 'leakage' inductance to bridges 303 and 304 to limit the rate of change of current during commutation from one thyristor to another eliminating the need for costly, inefficient separately wound commutating inductors positioned in the AC line of each bridge. Embodiments of the invention can be used in rectification (0 degree<alpha<90 degree) and inversion (90 degree<alpha<180 degree) mode.

Figure 7:
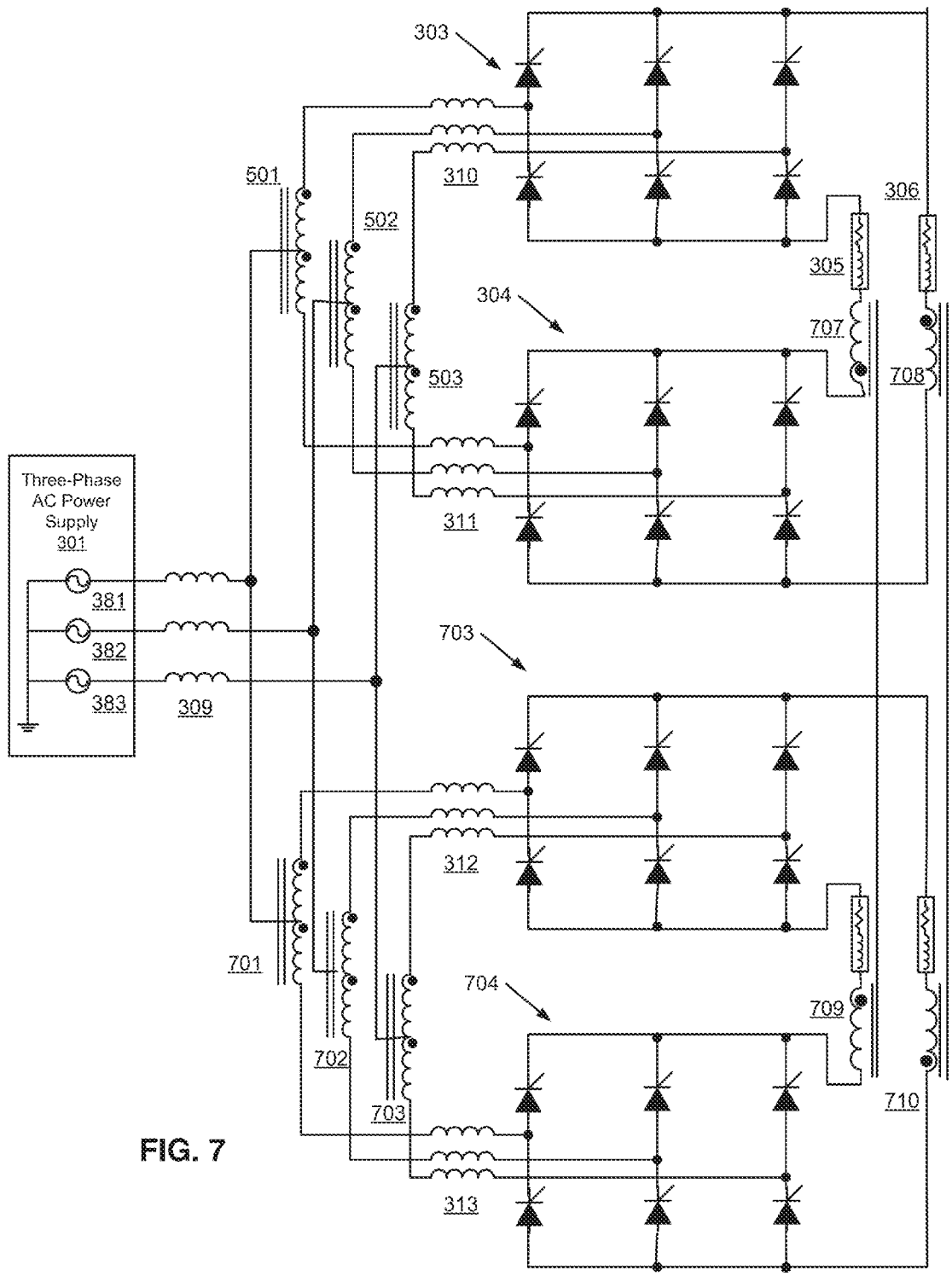
FIG. 7 is a schematic diagram illustrating a power converter according to another embodiment of the invention.

Embodiments of the invention can also be applied to higher order pulsed circuits. By connecting more AC to DC 6 pulse line commutated controlled converters to the same AC supply point and interconnecting coupled inductors the order of pulse number can be increased to obtain further reduction in AC current harmonics and a lower overall current distortion. For example, a mutually wound inductor can be implemented at both the AC side and DC side of an AC/DC converter, as shown in FIG. 7.

In one embodiment, converters 303-304 may be substantially equal, and the respective loads and their DC currents are substantially equal. The firing angles for the corresponding rectifiers in each converter may be substantially equal but oppositely offset from a nominal delay angle ($\alpha$1) by, for example, 7.5° (e.g., $\Delta\alpha$1=±7.5°). For example, given a rectifier of converter 303, all thyristors in 303 are fired continuously through each power cycle (or period) at ($\alpha$1+$\Delta\alpha$1). For the corresponding rectifier 304, all thyristors are fired continuously at an equal displacement angle but with opposite polarity (α1−Δα1) continuously through each power cycle. The magnitude of the offset value (e.g., Δα1) can be varied to adjust the cancellation of harmonic current components.

In one embodiment, converters 303-304 may be substantially equal, and the respective loads and their DC currents are substantially equal. The firing angles for the corresponding rectifiers in each converter may be substantially equal but oppositely offset from a nominal delay angle (α) by, for example, 7.5° (e.g., Δα=±7.5°) in an alternated manner. For example, given a rectifier of a first AC/DC converter (e.g., converter 303), a first firing angle of the rectifier may be (α+Δα) during a first power cycle (or period) and a second firing angle may be (α−Δα) during a second power cycle. The next firing angle is configured back to (α+Δα) in the third power cycle, etc. For the corresponding rectifier of a second or complementary AC/DC converter (e.g., converter 304), the corresponding firing angle is (α−Δα) for the first power cycle and (α+Δα) for the second power cycle, and (α−Δα) for the third power cycle etc. The magnitude of the offset value (e.g., Δα) can be varied to adjust the cancellation of harmonic current components.

In one embodiment, converters 703-704 may be substantially equal, and the respective loads and their DC currents are substantially equal. The firing angles for the corresponding rectifiers in each converter may be substantially equal but oppositely offset from a nominal delay angle (α2) by, for example, 7.5° (e.g., Δα2=±7.5°). For example, given a rectifier of converter 703, all thyristors in 703 are fired continuously through each power cycle (or period) at (α2+Δα2). For the corresponding rectifier 704, all thyristors are fired continuously at an equal displacement angle but with opposite polarity (α2−Δα2) continuously through each power cycle. The magnitude of the offset value (e.g., Δα2) can be varied to adjust the cancellation of harmonic current components.

In one embodiment, converters 703-704 may be substantially equal, and the respective loads and their DC currents are substantially equal. The firing angles for the corresponding rectifiers in each converter may be substantially equal but oppositely offset from a nominal delay angle (α) by, for example, 7.5° (e.g., Δα=±7.5°) in an alternated manner. For example, given a rectifier of a first AC/DC converter (e.g., converter 703), a first firing angle of the rectifier may be (α+Δα) during a first power cycle (or period) and a second firing angle may be (α−Δα) during a second power cycle. The next firing angle is configured back to (α+Δα) in the third power cycle, etc. For the corresponding rectifier of a second or complementary AC/DC converter (e.g., converter 704), the corresponding firing angle is (α−Δα) for the first power cycle and (α+Δα) for the second power cycle, and (α−Δα) for the third power cycle etc. The magnitude of the offset value (e.g., Δα) can be varied to adjust the cancellation of harmonic current components.

The nominal alpha for each pair of bridges is displaced by angle Δα3 or 15 degrees from the nominal alpha for the system 700, α3. For this embodiment, the nominal alpha of the system is approximately 90 degrees. For example the nominal alpha for converter pair 303-304 can be 75 degrees (90−Δα13), and the nominal alpha for converter pair 703-704 is 105 degrees (90+Δα3).

In one embodiment, converters 303, 304, 703, 704 may be substantially equal, and the respective loads and their DC currents are substantially equal. The firing angles for the corresponding pairs of converters may be substantially equal but oppositely offset from a nominal delay angle (α3) by, for example, 15° (e.g., Δα3=±15°). For example, given converter pair 303-304, the nominal firing angle may be continuously through each power cycle (or period) at angle (α3+Δα3). For the corresponding converter pair 703-704, the nominal firing angle may be continuously through each power cycle (α3−Δα3). The magnitude of the offset value (e.g., Δα3) can be varied to adjust the cancellation of harmonic current components.

In one embodiment of FIG. 7, the firing angles for the corresponding pair of converters may be substantially equal but oppositely offset from a nominal delay angle (α3) by, for example, 15° (e.g., Δα3=±15°) in an alternated manner. For example, given the converter pair 303 and 304, the nominal (or average) firing angle of all the rectifiers may be (α3+Δα3) during a first power cycle (or period) and a second firing angle may be (α3−Δα3) during a second power cycle. The next firing angle is configured back to (α3+Δα3) in the third power cycle, etc. For the corresponding complementary pair of converters, e.g., 703 and 704, the corresponding nominal (or average) firing angle is (α3−Δα3) for the first power cycle and (α3+Δα3) for the second power cycle, and (α3−Δα3) for the third power cycle etc. The magnitude of the offset value (e.g., Δα3) can be varied to adjust the cancellation of harmonic current components. Note that although AC/DC converters are described with respect to FIG. 7, 5 or more converters may also be utilized in parallel for the objective of increasing the number of pulses per power cycle. AC coupled inductors 501, 502, and 503 are wound onto a separate core with respect to coupled inductors 701, 702, and 703. AC coupled inductors 501, 502, and 503 are wound onto the same core. AC coupled inductors 701, 702, and 703 are wound onto the same core. Coils for DC mutual coupled inductor 707, 709 are wound on a common core. Coils for DC mutual inductor 708, and 710 are wound onto a common core.

Figure 8:
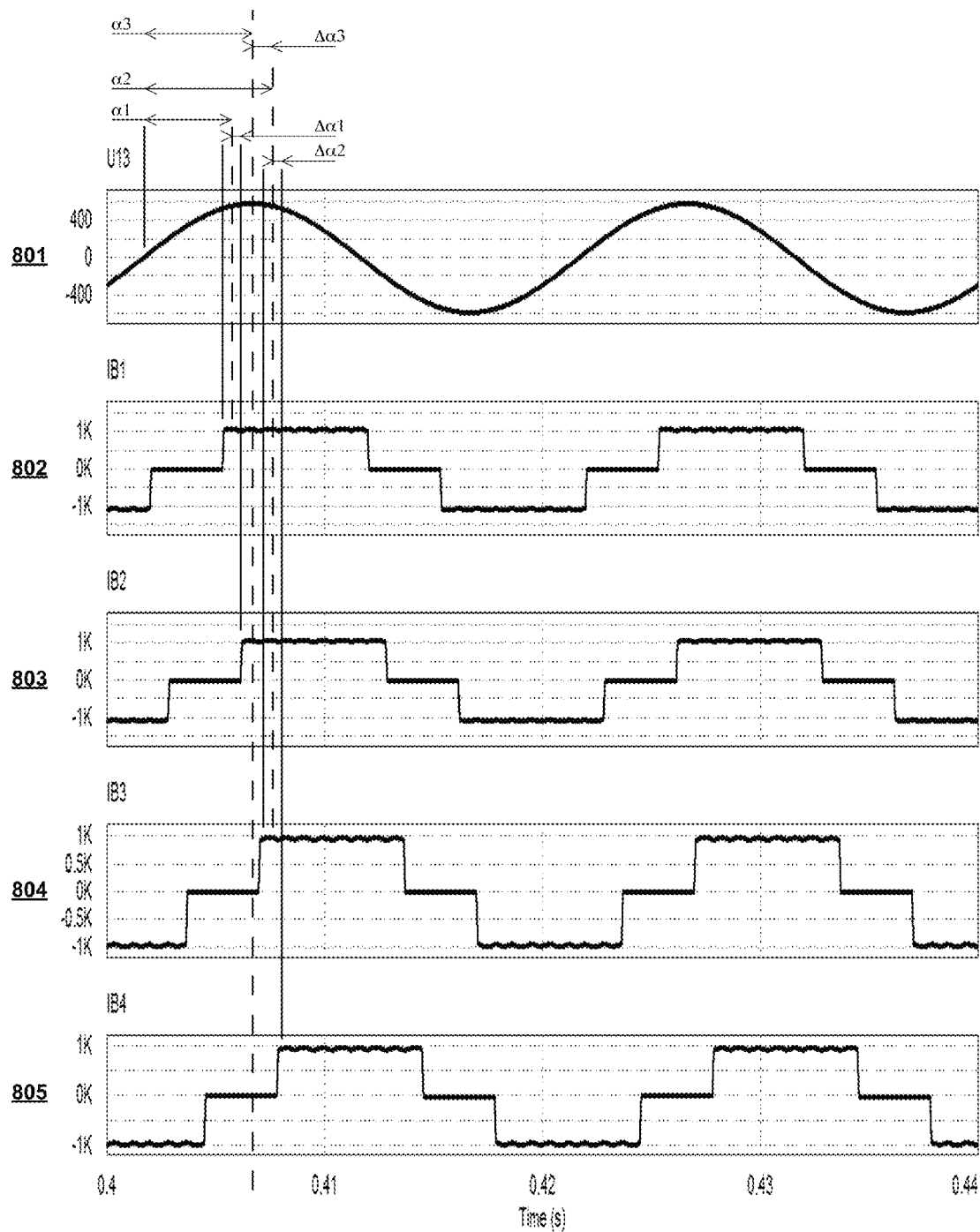
FIG. 8 is a diagram illustrating certain waveforms of certain components of a power converter as shown in FIG. 7.
Figure 8B:
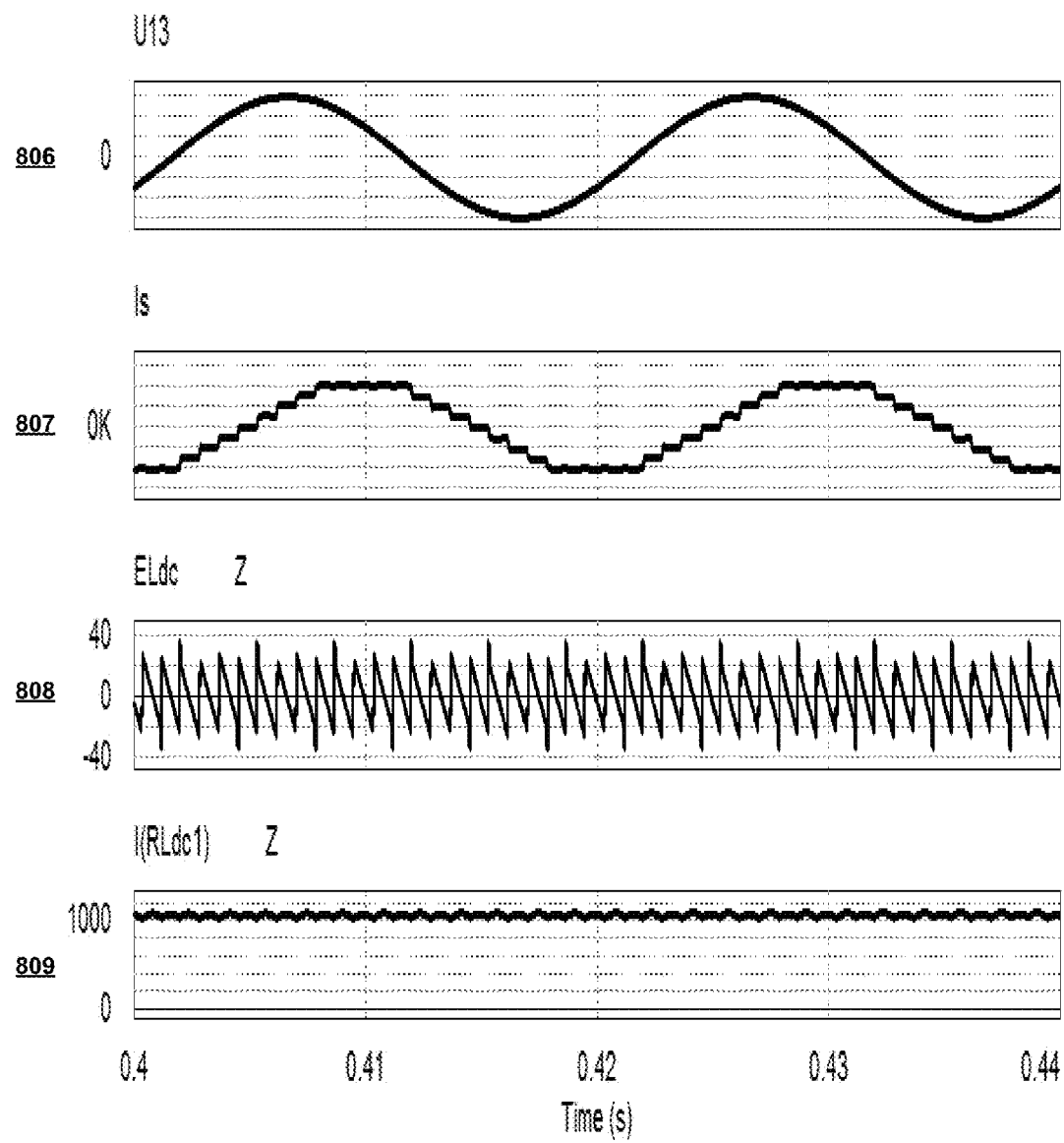
FIG. 8B is a diagram illustrating certain waveforms of certain components of a power converter as shown in FIG. 7.

FIGS. 8 and 8B show the waveforms for the embodiment of FIG. 7 according to certain embodiments. As can be seen 802 and 803 show the AC current through one phase of inductors 310 and 311. Waveforms 804 and 805 show the AC current through one phase of inductors 312 and 313. The total current supplied by source 381, shown in waveform 807, is substantially 24 pulse in nature forming a multi-pulse stepped waveform with lower harmonic distortion than previous 12-pulse embodiments. The voltage across 305 is shown in 808. The current through 305 is shown in 809. From 808 and 809 it can be deduced that there are 24 pulses of voltage and current ripple per power cycle.

Higher order pulsed AC current is beneficial when connecting high power equipment to power networks as authorities governing these networks are applying more stringent controls of the limits of harmonic content the AC current may have. A 24-pulse system, while having a higher component count, can be more cost effective as it can alleviate the need for additional harmonic filtering.

According to one embodiment, an AC power conversion system includes a first alternating current to direct current (AC/DC) converter to be coupled to a multi-phase AC power supply, the first AC/DC converter having a plurality of rectifiers, a second AC/DC converter coupled in parallel with the first AC/DC converter to the multi-phase AC power supply, the second AC/DC converter having a plurality of rectifiers, a first DC load in series with a first inductor coupled to a first positive DC terminal of the first AC/DC converter and a second negative DC terminal of the second AC/DC converter, and a second DC load in series with a second inductor coupled to a first negative DC terminal of the first AC/DC converter and a second positive DC terminal of the second AC/DC converter. The first inductor and the second inductor are mutually wound to provide mutual inductance with respect to the first DC load and the second DC load. The first inductor comprises a first coil and the second inductor comprises a second coil, and wherein the first coil and the second coil are wound onto the same inductor core. The first inductor and the second inductor form an inter-phase transformer. The first inductor and the second inductor are to reduce AC ripples across the first DC load and the second DC load. The first AC/DC converter comprises at least six rectifiers forming a first rectifier bridge and the second AC/DC converter comprises at least six rectifiers forming a second rectifier bridge. The first AC/DC converter comprises at least six thyristors forming a first rectifier bridge and the second AC/DC converter comprises at least six thyristors forming a second rectifier bridge. The first AC/DC converter is triggered with a first predetermined angle in advanced, while the second AC/DC converter is triggered with a second predetermined angle in delay.

According to another embodiment, an AC power conversion system includes a first alternating current to direct current (AC/DC) converter, the first AC/DC converter having a plurality of rectifiers, a second AC/DC converter, the second AC/DC converter having a plurality of rectifiers, a first inductor coupled in series with the first AC/DC converter to a multi-phase AC power supply, the first AC/DC converter having a plurality of rectifiers, a second inductor coupled in series with the second AC/DC converter to the multi-phase AC power supply, wherein the first inductor and the second inductor are mutually wound onto the same inductor core, a first DC load coupled to a first positive DC terminal of the first AC/DC converter and a second negative DC terminal of the second AC/DC converter, and a second DC load coupled to a first negative DC terminal of the first AC/DC converter and a second positive DC terminal of the second AC/DC converter.

The first and second mutually wound inductors include a first coil coupled to a first phase input of the first AC/DC converter, and a second coil coupled to a first phase input of the second AC/DC converter, where the first coil and the second coil are coupled in series forming a first center tap, where the first center tap is coupled to a first line output of the multi-phase AC power supply, and where the first coil and the second coil are wound onto the same inductor core. The first and second mutually wound inductors further include a third coil coupled to a second phase input of the first AC/DC converter; and a fourth coil coupled to a second phase input of the second AC/DC converter, wherein the third coil and the fourth coil are coupled in series forming a second center tap, and wherein the second center tap is coupled to a second line output of the multi-phase AC power supply, wherein the third coil and the fourth coil are wound onto the same inductor core. The first and second mutually wound inductors further include a fifth coil coupled to a third phase input of the first AC/DC converter; and a sixth coil coupled to a third phase input of the second AC/DC converter, wherein the fifth coil and the sixth coil are coupled in series forming a third center tap, and wherein the third center tap is coupled to a third line output of the multi-phase AC power supply, wherein the fifth coil and the sixth coil are wound onto the same inductor core. The first coil, the second coil, the third coil, the fourth coil, the fifth coil, and the sixth coil are wound onto the same inductor core.

The first AC/DC converter includes at least six rectifiers forming a first rectifier bridge and the second AC/DC converter comprises at least six rectifiers forming a second rectifier bridge. The first AC/DC converter includes at least six thyristors forming a first rectifier bridge and the second AC/DC converter comprises at least six thyristors forming a second rectifier bridge. The first AC/DC converter is triggered with a first predetermined angle in advanced, while the second AC/DC converter is triggered with a second predetermined angle in delay. The system further includes a third inductor coupled in series with the first DC load between the first positive DC terminal of the first AC/DC converter and the second negative DC terminal of the second AC/DC converter, and a fourth inductor coupled in series with the second DC load between the first negative DC terminal of the first AC/DC converter and the second positive DC terminal of the second AC/DC converter. The third inductor and the fourth inductor are mutually wound onto the same inductor core. The third inductor and the fourth inductor form an inter-phase transformer. The third inductor and the fourth inductor are to reduce AC ripples across the first DC load and the second DC load.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An alternating current (AC) power conversion system, comprising:
   a first alternating current to direct current (AC/DC) converter to be coupled to a multi-phase AC power supply, the first AC/DC converter having a plurality of rectifiers;
   a second AC/DC converter coupled in parallel with the first AC/DC converter to the multi-phase AC power supply, the second AC/DC converter having a plurality of rectifiers;
   a first DC load in series with a first inductor coupled to a first positive DC terminal of the first AC/DC converter and a second negative DC terminal of the second AC/DC converter; and
   a second DC load in series with a second inductor coupled to a first negative DC terminal of the first AC/DC converter and a second positive DC terminal of the second AC/DC converter.

2. The system of claim 1, wherein the first inductor and the second inductor are mutually wound to provide mutual inductance with respect to the first DC load and the second DC load.

3. The system of claim 1, wherein the first inductor comprises a first coil and the second inductor comprises a second coil, and wherein the first coil and the second coil are wound onto the same inductor core.

4. The system of claim 3, wherein the first inductor and the second inductor form an inter-phase transformer.

5. The system of claim 1, wherein the first inductor and the second inductor are to reduce AC ripples across the first DC load and the second DC load.

6. The system of claim 1, wherein the first AC/DC converter comprises at least six rectifiers forming a first rectifier bridge and the second AC/DC converter comprises at least six rectifiers forming a second rectifier bridge.

7. The system of claim 1, wherein the first AC/DC converter comprises at least six thyristors forming a first rectifier bridge and the second AC/DC converter comprises at least six thyristors forming a second rectifier bridge.

8. The system of claim 1, wherein the first AC/DC converter is triggered with a first predetermined angle in advanced, while the second AC/DC converter is triggered with a second predetermined angle in delay.

9. An alternating current (AC) power conversion system, comprising:

a first alternating current to direct current (AC/DC) converter, the first AC/DC converter having a plurality of rectifiers;

a second AC/DC converter, the second AC/DC converter having a plurality of rectifiers;

a first inductor coupled in series with the first AC/DC converter to a multi-phase AC power supply, the first AC/DC converter having a plurality of rectifiers;

a second inductor coupled in series with the second AC/DC converter to the multi-phase AC power supply, wherein the first inductor and the second inductor are mutually wound onto the same inductor core;

a first DC load coupled to a first positive DC terminal of the first AC/DC converter and a second negative DC terminal of the second AC/DC converter; and a second DC load coupled to a first negative DC terminal of the first AC/DC converter and a second positive DC terminal of the second AC/DC converter.

10. The system of claim 9, wherein the first and second mutually wound inductors comprise:

a first coil coupled to a first phase input of the first AC/DC converter; and a second coil coupled to a first phase input of the second AC/DC converter, wherein the first coil and the second coil are coupled in series forming a first center tap, wherein the first center tap is coupled to a first line output of the multi-phase AC power supply, and wherein the first coil and the second coil are wound onto the same inductor core.

11. The system of claim 10, wherein the first and second mutually wound inductors further comprise:

a third coil coupled to a second phase input of the first AC/DC converter; and a fourth coil coupled to a second phase input of the second AC/DC converter, wherein the third coil and the fourth coil are coupled in series forming a second center tap, wherein the second center tap is coupled to a second line output of the multi-phase AC power supply, and wherein the third coil and the fourth coil are wound onto the same inductor core.

12. The system of claim 11, wherein the first and second mutually wound inductors further comprise:

a fifth coil coupled to a third phase input of the first AC/DC converter; and a sixth coil coupled to a third phase input of the second AC/DC converter, wherein the fifth coil and the sixth coil are coupled in series forming a third center tap, wherein the third center tap is coupled to a third line output of the multi-phase AC power supply, and wherein the fifth coil and the sixth coil are wound onto the same inductor core.

13. The system of claim 12, wherein the first coil, the second coil, the third coil, the fourth coil, the fifth coil, and the sixth coil are wound onto the same inductor core.

14. The system of claim 9, wherein the first AC/DC converter comprises at least six rectifiers forming a first rectifier bridge and the second AC/DC converter comprises at least six rectifiers forming a second rectifier bridge.

15. The system of claim 9, wherein the first AC/DC converter comprises at least six thyristors forming a first rectifier bridge and the second AC/DC converter comprises at least six thyristors forming a second rectifier bridge.

16. The system of claim 9, wherein the first AC/DC converter is triggered with a first predetermined angle in advanced, while the second AC/DC converter is triggered with a second predetermined angle in delay.

17. The system of claim 9, further comprising:

a third inductor coupled in series with the first DC load between the first positive DC terminal of the first AC/DC converter and the second negative DC terminal of the second AC/DC converter; and a fourth inductor coupled in series with the second DC load between the first negative DC terminal of the first AC/DC converter and the second positive DC terminal of the second AC/DC converter.

18. The system of claim 17, wherein the third inductor and the fourth inductor are mutually wound onto the same inductor core.

19. The system of claim 17, wherein the third inductor and the fourth inductor form an inter-phase transformer.

20. The system of claim 17, wherein the third inductor and the fourth inductor are to reduce AC ripples across the first DC load and the second DC load.

* * * * *